United States Patent [19]

Sando et al.

[11] Patent Number: 5,319,178

[45] Date of Patent: Jun. 7, 1994

[54] WELDING APPARATUS FOR FUEL ROD END PLUGS

[75] Inventors: Akio Sando; Minoru Murata; Eiji Yoneda, all of Ibaraki, Japan

[73] Assignee: Mitsubishi Nuclear Fuel Co., Tokyo, Japan

[21] Appl. No.: 976,338

[22] Filed: Nov. 13, 1992

[30] Foreign Application Priority Data

Nov. 14, 1991 [JP] Japan .................................. 3-299254

[51] Int. Cl.⁵ ............................................ B23K 9/00
[52] U.S. Cl. ............................................ 219/125.11
[58] Field of Search ................... 219/60 R, 61, 125.11, 219/137 R; 228/7

[56] References Cited

U.S. PATENT DOCUMENTS

| 4,075,454 | 2/1978 | Duncan et al. | 219/137 R |
| 4,511,075 | 4/1985 | Yeo | 228/7 |

FOREIGN PATENT DOCUMENTS

| 0361891 | 4/1990 | European Pat. Off. . |
| 0405170 | 1/1991 | European Pat. Off. . |
| 3339241 | 5/1985 | Fed. Rep. of Germany . |
| 3605494 | 8/1986 | Fed. Rep. of Germany . |
| 1594959 | 7/1970 | France . |
| 2331126 | 6/1977 | France . |
| 2400752 | 3/1979 | France . |
| 59-209487 | 11/1984 | Japan | 219/137 R |
| 1432180 | 4/1976 | United Kingdom . |

OTHER PUBLICATIONS

Patent Abstracts of Japan, vol. 009, No. 080 (M-730), Apr. 10, 1985, JP-A-59 209 487, Nov. 28, 1984.

Primary Examiner—Clifford C. Shaw
Attorney, Agent, or Firm—Oblon, Spivak, McClelland, Maier & Neustadt

[57] ABSTRACT

A welding apparatus for welding an end plug on the end of a pellet filled nuclear fuel rod includes a holding mechanism, an abutting member, a torch and a pressing mechanism. The holding mechanism is for holding the external periphery of the fuel rod with the end plug attached thereto. The abutting member is disposed opposite to the holding mechanism, and the end plug of the fuel rod butts up against the abutting member. The torch is disposed between the holding mechanism and the abutting member, and is placed diametrically opposite to the external surface of the fuel rod. The holding mechanism and the abutting member are made so that the distance therebetween can be adjusted, and the pressing mechanism is provided on one of the holding mechanism or the abutting member, and operates to move the holding mechanism and the abutting member to approach each other. In a welding apparatus of such a design, the fuel rod is held by the holding mechanism, and the pressing mechanism pushes the holding mechanism toward the abutting member, and while retaining such a position at a constant compressive force, welding of the end plug is performed. Therefore, the welding is performed without being affected by the variations in the compressive force caused by welding heat distortions, thereby providing a weld of high integrity and quality.

15 Claims, 7 Drawing Sheets

WELDING APPARATUS FOR FUEL ROD END PLUGS

BACKGROUND OF THE INVENTION

The present invention relates to an apparatus for welding the end plugs on the fuel rods filled with nuclear fuel pellets.

In general, each fuel rod for use in nuclear reactors contains fuel in the form of pellets.

In a conventional method for producing such fuel rods, a given quantity of pellets are inserted into a closed-end fuel rod tube and, to retain the pellets in place in the rod, a spring in inserted together with the end plug, and the fuel rod is sealed by welding the end plug to the rod tube (fuel rod). To ensure the contact between the end plug and the fuel rod end against the force of the spring, the conventional practice has been to press fit the end plug into the tube to provide contacts, and then to weld the end plug to the rod.

Because of such a configuration of the fuel rod, however, welding is carried out while holding the positions of the fuel rod and the end plug fixed to prevent loosening of the plug and obtain uniform welding around the rod. However, it was difficult to achieve uniform welding with such a welding method, because of the variations in the state of contact between the rod and the end plug during welding, caused by thermal distortions of the fuel rod, i.e. changing stress conditions at the weld due to the axial expansion and contraction in the fuel rod. Achieving a high degree of welding precision by such conventional method required a substantial welding expertise.

SUMMARY OF THE INVENTION

The objective of the present invention is to present a welding apparatus for welding an end plug to an open end of a pellets-filled fuel rod so as not to be affected by thermal distortions due to welding heat, by keeping the contact region between the end plug and the fuel rod at a constant predetermined compressive force, thereby producing a weld of high uniform quality.

A welding apparatus is presented for joining an end plug to a fuel rod, having a closed end at one end thereof and an open end at the opposite end thereof, and having nuclear fuel pellets filled thereinbetween. The apparatus comprises:

(a) holding means for holding an external peripheral surface of the fuel rod inserted in an axial direction thereinto;

(b) an abutting section disposed opposite to the holding means for abutting the end plug of the fuel rod inserted through the holding means, the holding means being movable in the axial direction for adjusting spacing between the holding means and the abutting section;

(c) a welding means disposed diametrically opposite to the peripheral surface of the fuel rod between the holding means and the abutting means;

(d) pressing means disposed on one of the holding means or the abutting means for pressing said holding means and said abutting means towards each other at a constant compression force.

In the apparatus of the present invention, the end plug is welded to the fuel rod by a torch while being held by the holding mechanism, and either the holding mechanism or the abutting section is being made to approach each other by means of the pressing mechanism. Therefore, welding of the end plug to the fuel rod can be carried out not being affected by thermal distortions due to welding heat, because the contact region between the end plug and the fuel rod is kept at a constant predetermined compressive force, thus enabling the production of a weld of high uniform quality.

It is preferable to provide a positioning mechanism, to fix the position of one of either the holding mechanism or the abutting section at a predetermined position prior to welding, and to relieve the fixed position during the welding process. A fuel rod having a prefitted end plug is then inserted into the apparatus from the end of the apparatus until the end plug fitted into the fuel rod butts up against the abutting section of the apparatus. The fuel rod is fixed in this position by the holding mechanism, and the positioning device is released so that either the holding mechanism or the abutting section becomes movable. By so doing, it is possible to return the holding mechanism or the abutting section is returned to the initial position prior to welding. By this arrangement, the holding mechanism is able to hold the fuel rod at the predetermined constant position in the fuel rod. Therefore, many fuel rods can be welded repeatedly without affecting the positioning precision.

It is further preferable to provide measuring means for controlling the pressing mechanism by measuring the compressive stress between the end plug and the fuel rod being held fixed by the holding mechanism and controlling the pressing force according to the measurements provided by the measuring means. The controlling mechanism controls the compressive force at the contact region between the end plug being butted up against the abutting section and the fuel rod so the force is constant during the welding process. This arrangement enables fine controls on the compressive force to be exercised, to thereby prevent generating residual stresses in the weld, and welding defects such as substrate undercutting and oversize weld, thus achieving a weld of high uniform quality.

It is further preferable to provide an elastic component to either hold the pressing device or to push the abutting section, and a motive means such as an electric motor to operate the elastic component via transmitting means. By such an arrangement, it becomes possible to improve the response of the holding of the holding mechanism or pressing of the abutting section to the pressure at the contact region between the end plug and the fuel rod, so that the contact pressure can be kept constant at a desired predetermined pressure.

DESCRIPTION OF THE PREFERRED EMBODIMENTS

The preferred embodiments are explained with reference to FIGS. 1 to 11.

Figure 1:
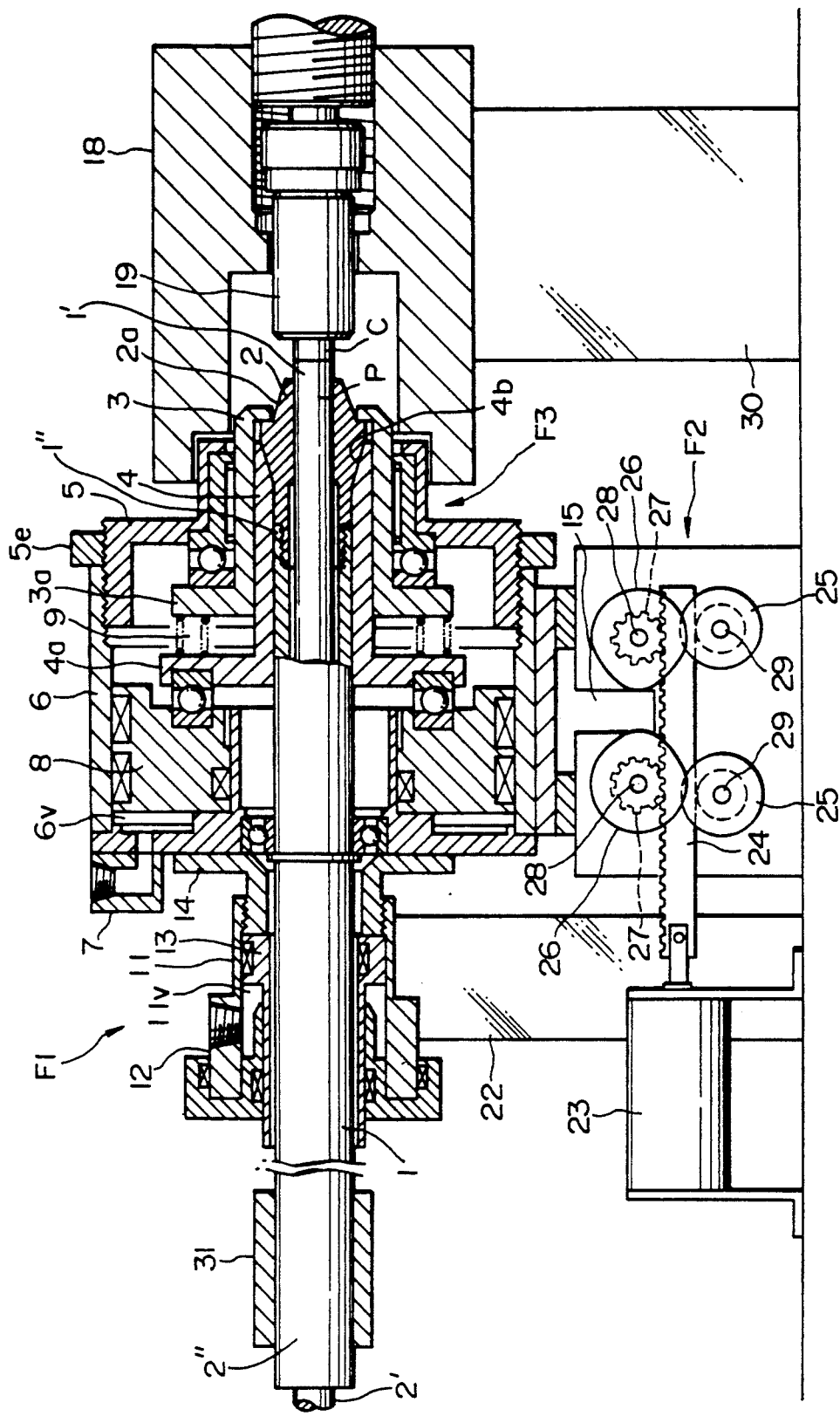
FIG. 1 is a cross-sectional side view of a first embodiment of the invention.
Figure 2:
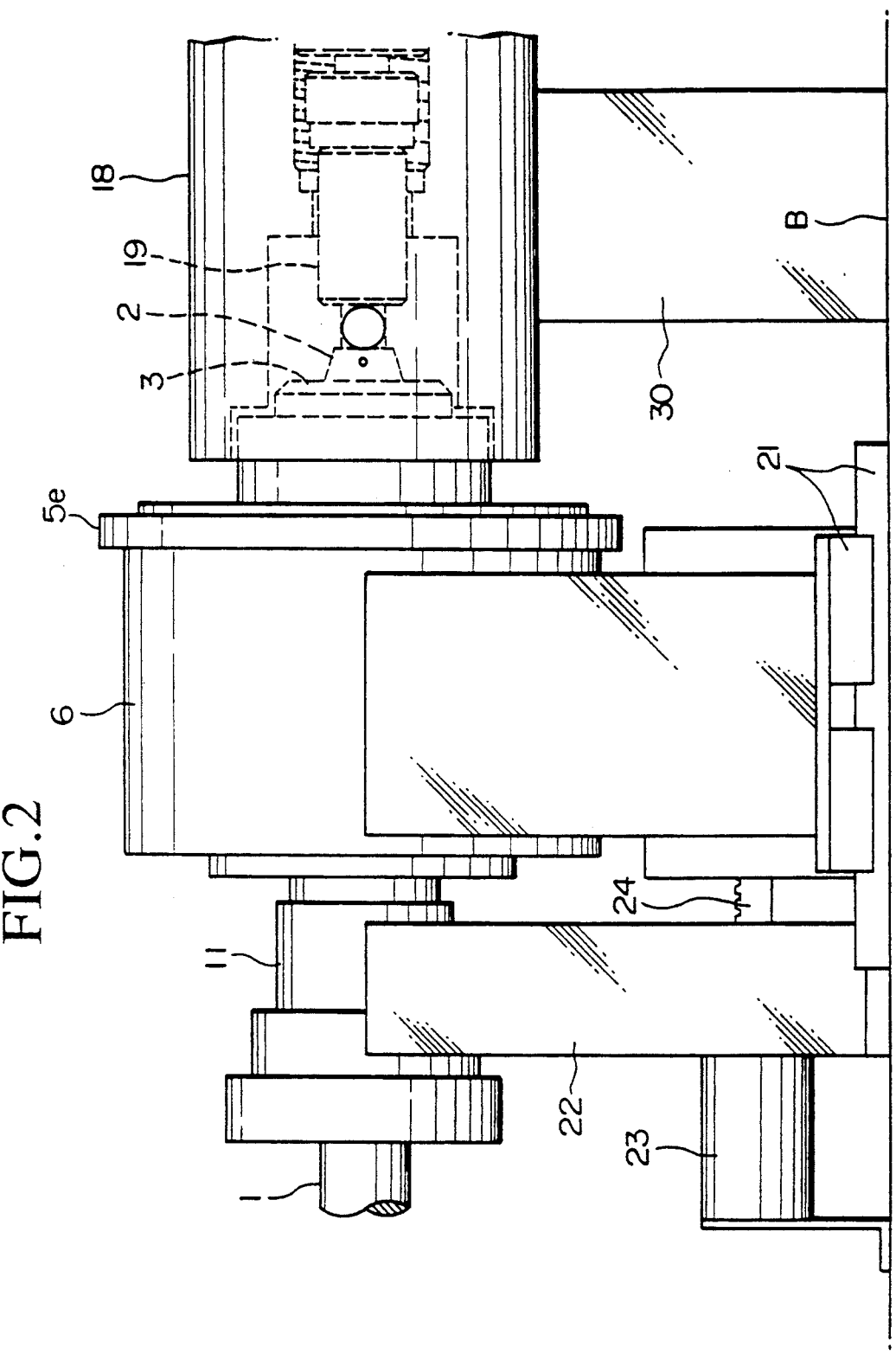
FIG. 2 is a side view showing the external appearance of the first embodiment.

FIG. 1 shows an overall cross sectional side view of a first embodiment of the welding apparatus, and FIG. 2 shows an external side view of the apparatus. The apparatus comprises:

(a) a hollow shaft 1 for inserting a fuel rod P;

(b) a holding mechanism F3 disposed at one end of the hollow shaft 1 for holding a fuel rod P having an end plug C press fitted therein;

(c) an abutting section 19 which abuts the end plug C of the fuel rod P;

(d) a torch 16 (see FIG. 6) to weld the fuel rod P with the end plug C;

and is provided with:

(e) a positioning mechanism F2 for fixing the position of the holding mechanism F3 during the rod P-holding period, and for releasing the hold during the end plug C-welding period;

(f) a pressing mechanism F1 which pushes the hollow shaft 1 toward the abutting section 19 at a predetermined pressure during the end plug C-welding period.

The apparatus is explained further in the following with reference to FIGS. 1 and FIG. 3 which shows the details of the arrangement of the components for gripping the fuel rod P. In describing the apparatus, the axial direction is the direction of insertion of the fuel rod P into the hollow shaft 1, and the end region of the fuel rod P which is welded to the end plug C is referred to as the end 1', and the opposite end region is referred to as the end 2'. The end references are used also in the same manner for all the other components of the apparatus.

The hollow shaft 1 has a hollow core for freely inserting a fuel rod P therethrough from end 2', and a holding mechanism F3. The holding mechanism F3 comprises: a collet 2 screwed on to an end 1" of the hollow shaft 1; a collet closure 4 disposed around the external periphery of the collet 2; a nose ring 3; a chuck cylinder 6 which press the collet closure 4 toward the hollow shaft 1; and a piston 8.

The collet 2 of the holding mechanism F3 is constructed to enable extending the end 1' of the fuel rod P through the hollow shaft 1, and is split radially in multiples so as to firmly grip the external periphery of the inserted fuel rod P. Further, the outer surface of the collet 2 is shaped as a taper, as shown in FIG. 3, in the vicinity of the extended fuel rod P in such a way that the taper radius increases toward the end 1' of the extended fuel rod P, and ending in a stepped section 2a at the outermost end toward the abutting section 19.

The end 1" of the hollow shaft 1 having the collet 2 is provided with a cylindrical collet closure 4 having a donut-shaped flange 4a at one end, and having a taper section 4b at the end 1' on the internal peripheral surface to engage with the taper section of the collet 2; and the diameter of the collet 2 can be expanded or contracted by sliding the collet closure 4 on the external peripheral surface of the hollow shaft 1 in the axial direction.

Figure 3:
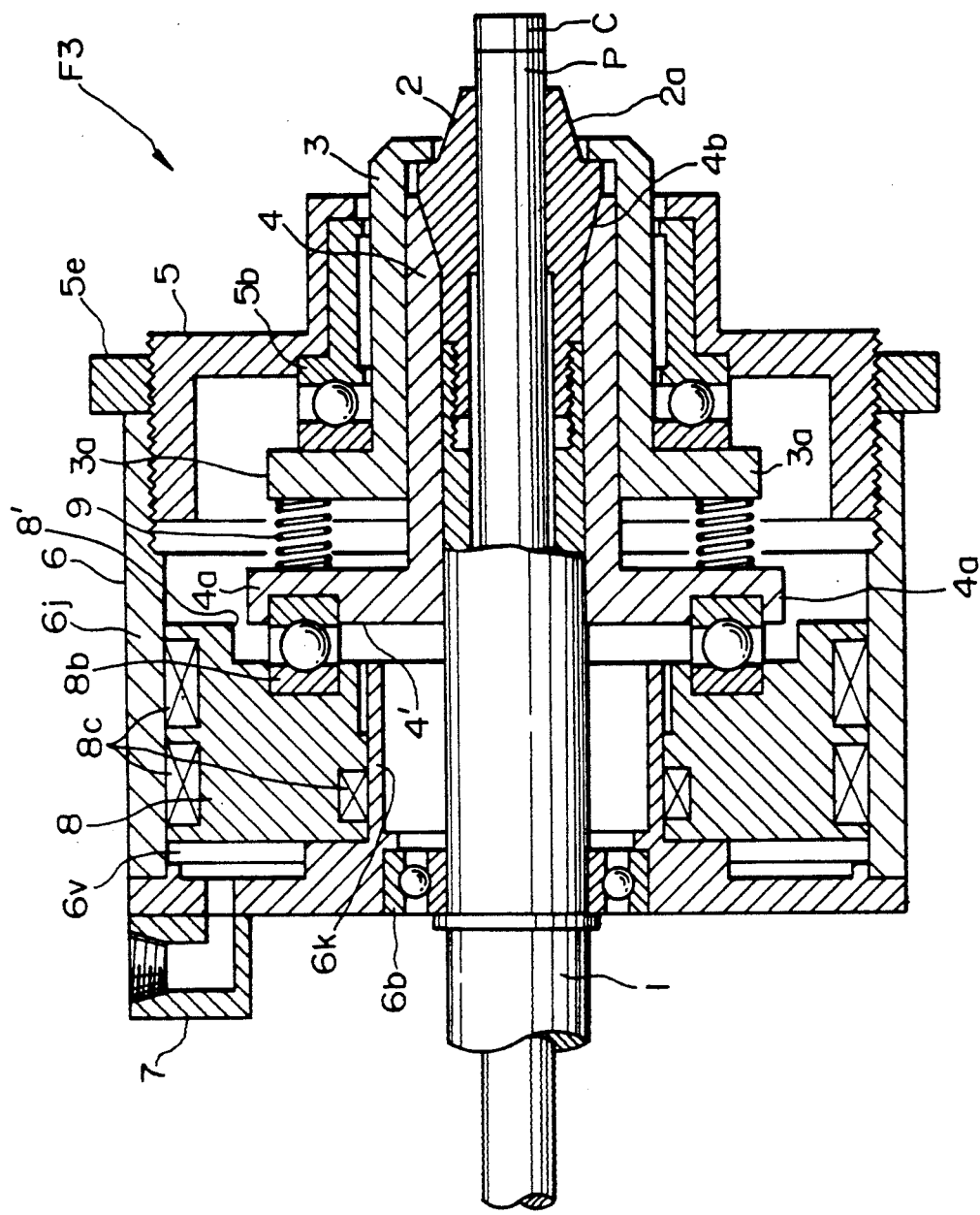
FIG. 3 is a cross sectional side view of a holding mechanism.

A cylindrical nose ring 3, as shown in FIGS. 1 and 3, is provided with an open bottom on the external periphery at the end 1', and by engaging the open bottom with the stepped section 2a of the collet 2, only the leading tip of the collet 2 is made to extend out in the axial direction. A flange 3a is provided at one end of the nose ring 3, and an elastic component 9 is provided between the flange 3a of the nose ring 3 and the flange 4a of the collet closure 4, so as to push the two flanges away in the opposite axial directions.

The collet closure 4 and the nose ring 3 are both made to be rotatable along with the rotation of the hollow shaft 1 and collet 2; and the rotating parts: hollow shaft 1; collet 2; collet closure 4 and nose ring 3 are freely rotatably supported by the chuck cylinder 6 (acting as housing), as shown in FIG. 3, and a screwed-on collet adjusting ring 5 via bearings 5b, 6b and 8b.

The chuck cylinder 6, as shown in FIG. 3, is a double-walled cylinder having end plates, forming a cylinder chamber 6v between an outside cylinder 6j and an inside cylinder 6k. The hollow shaft 1 is supported by the bearing 6b provided on the inside cylinder 6k. Inside the cylinder chamber 6v, a donut-shaped piston 8 is disposed and is movable to and fro in the axial direction by means of separately provided fluidic means, not shown, such as oil or pneumatic pressurizing devices.

The reference numeral 7 indicates a guard block for piping for introducing pressurizing medium, such as oil and air, into the cylinder chamber 6v, and 8c is a sealing member such as O-rings.

The end surface 8 of the piston 8 faces the end surface 4' of the flange 4a of the collet closure 4 so as to transmit the movement of the piston 8 in the axial direction to the collet closure 4 rotating with the hollow shaft 8'. The end 1' of the piston 8 is supported with a bearing 8b.

On one end of the chuck cylinder 6 is disposed a screw-on collet adjusting ring 5 which supports the nose ring 3, disposed around the hollow shaft 1 and around the collet closure 4 and rotating therewith, in the axial direction by means of a bearing 5b, and also serves to provide fine positional adjustments in the axial direction for the relative position of the chuck cylinder 6 with respect to the nose ring 3 which determines the position of the collet 2 on the hollow shaft 1. The reference numeral 5e refers to a lock nut for the collet adjustment ring 5.

As shown in FIG. 1, an end 2" of the hollow shaft 1 is freely rotatably supported with a slide bearing 31 enabling the hollow shaft 1 to translate in the axial direction.

Figure 6:
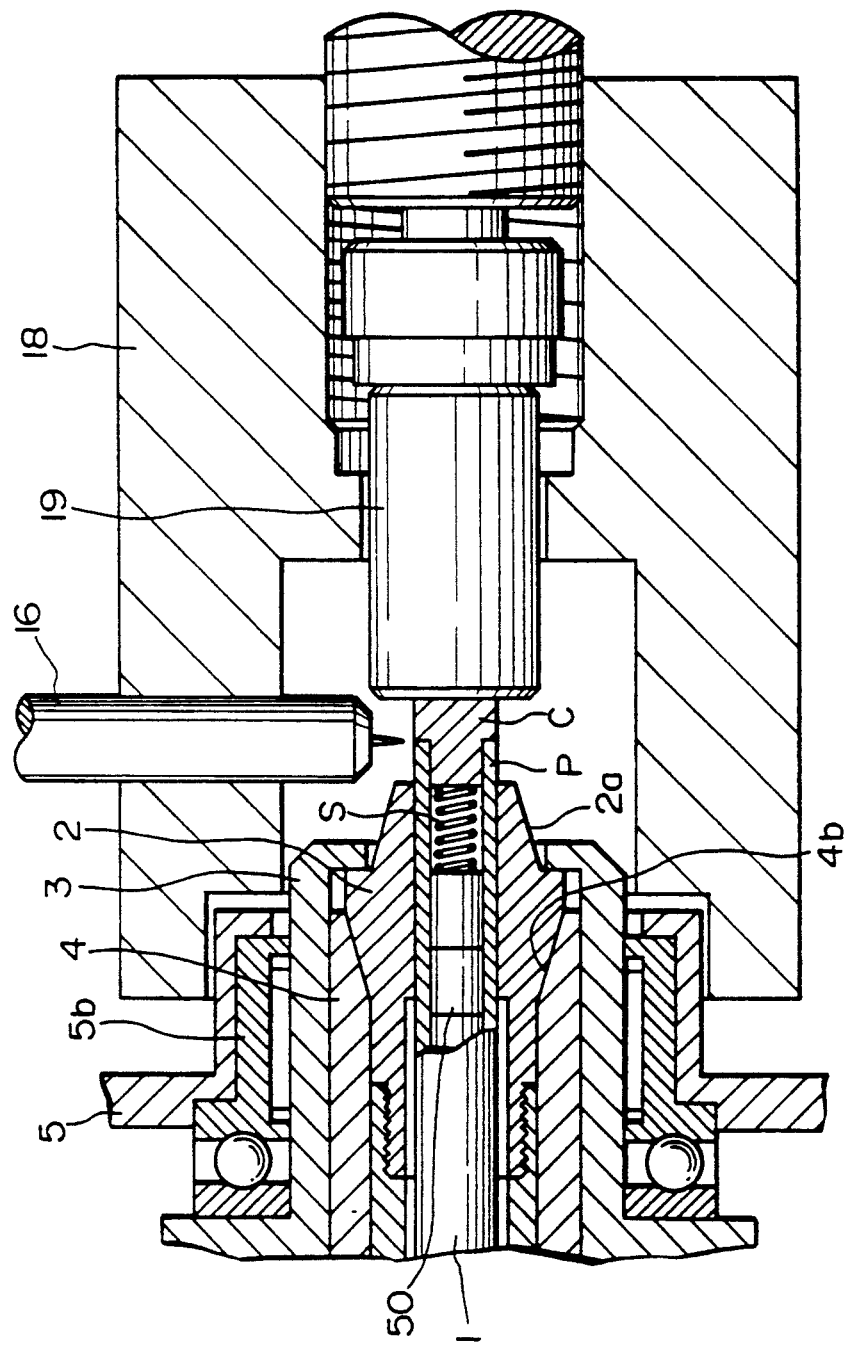
FIG. 6 is a cross sectional plan view of a tip end of the main axis and the abutting section and a welding torch.

As shown in FIG. 1 and in FIG. 6 in more detail disposed at the end 1" and the end 1' of the fuel rod P of the hollow shaft 1 is an abutting section 19 acting as a stopper for the fuel rod P. The abutting section 19 is positioned so that the fuel rod P with an end plug C at its end 1' inserted through the hollow shaft 1 and emerging through the collet 2 of the holding mechanism F3 butts up against the surface of the abutting section 19, so that a predetermined amount of the fuel rod P extends out of the collet 2. The abutting section 19 is aligned with the fuel rod P so as to enable it to rotate freely coaxially with the fuel rod P gripped in the collet 2 of the hollow shaft 1.

The end plug C for plugging the end 1' of the fuel rod P is a component which is formed in a stepped cylinder form, as shown in FIG. 6, and the smaller diameter portion is press fitted into the end 1' of the fuel rod P, so as to butt the larger diameter section of the end plug C against the outer diameter of the fuel rod P of about the same diameter, to form a contact region therebetween to be welded. Further, since a plurality of fuel pellets 50 are charged into the fuel rod P, the end plug C serves to contain the pellets 50 inside the fuel rod P by means of the spring S disposed therein. The abutting section 19 serves the purpose of positioning the end plug C at the same constant position axially, and therefore, is disposed in a fixed position to define the welding position of the welding apparatus of the present invention.

On the external periphery of the abutting section 19 is disposed a welding chamber 18 which surrounds the fuel rod P and the end plug C, extending out of the collet 2 against the abutting section 19, and provides a protective atmosphere of shielding gases during the welding process.

As shown in the plan view of FIG. 6, an inert gas arc welding torch 16 is inserted from the external periphery of the welding chamber 18 to dispose the torch tip in the vicinity of the collet 2. That is, the welding torch 16 is disposed so that the torch tip faces the external peripheries of the end 1' of the fuel rod P and the end plug C butting against the abutting section 19, along the direction of the diameter of the fuel rod P.

Figure 4:
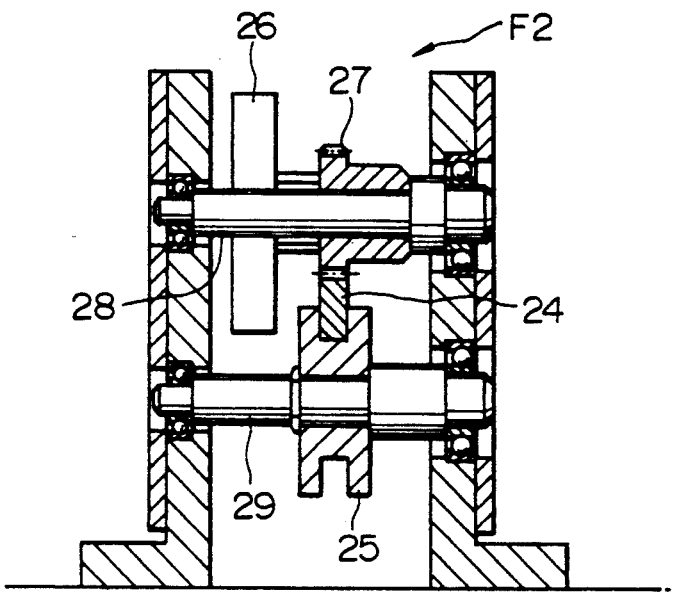
FIG. 4 is a front cross sectional view of a positioning mechanism.

In the present apparatus, in addition to the mechanisms presented in the foregoing, the holding mechanism F3 which holds the fuel rod P in the predetermined position by fluid pressure methods, and the welding facility to weld the fuel rod P and the end plug pressed fitted into the end 1' thereof, a position retaining mechanism F2 is provided, as shown in FIGS. 1 and 4,.

The positioning mechanism F2 fixes the holding device F3 in place when it is holding the fuel rod P, which has been properly positioned by inserting the fuel rod P through the hollow shaft 1 and butting it up against the abutting section 19. During the welding operation of the end plug C, however, the positioning device F2 releases the fixation of the fuel rod P.

FIG. 2 shows an external appearance of the apparatus. It shows the chuck cylinder 6 which freely rotatably supports the end 1" of the hollow shaft 1 and the end 1' of the fuel rod P, and is mounted on a base B so as to be movable in the axial direction together with the hollow shaft 1. On the other hand, the abutting section 19 for the end plug C and the slide bearing 31 which supports the end 2" of the hollow shaft 1 are fixed on the base B.

Referring back to FIG. 1, the positioning mechanism F2 comprises: a cylinder mechanism 23 disposed on the base B; an axially translating rack 24 disposed on a rod of the cylinder mechanism 23 and extending parallel to the hollow shaft 1; a pair of cams 26 which are rotated in the same direction by the translational movement of the rack 24; and a lever 15 which protrudes out from the outer periphery of the chuck cylinder 6 and is held between a pair of cams 26.

As shown in FIG. 1 and in FIG. 4 which is a front cross sectional view of the positioning mechanism F2, the axially translating rack 24 is engaged in the grooves formed on the peripheral surfaces of each of a pair of guide rollers 25 on a pair of shafts 29 disposed transverse to the axial direction, and maintains a parallel alignment with the hollow shaft 1. The teeth of the rack 24 are engaged with the pinion gears 27 disposed on each of the freely rotatable shafts 28 transverse to the axial direction. The foregoing cams 26 are provided on the shafts 28 of the pinion gears 27.

As shown in FIG. 1, each of the pinion gear S 27 is engaged with the rack 24 so that the pair of cams 26, rotated in the same direction by the rack 24, will be symmetrical in the side view with respect to the lever 15 disposed between the cams 26.

Figure 5:
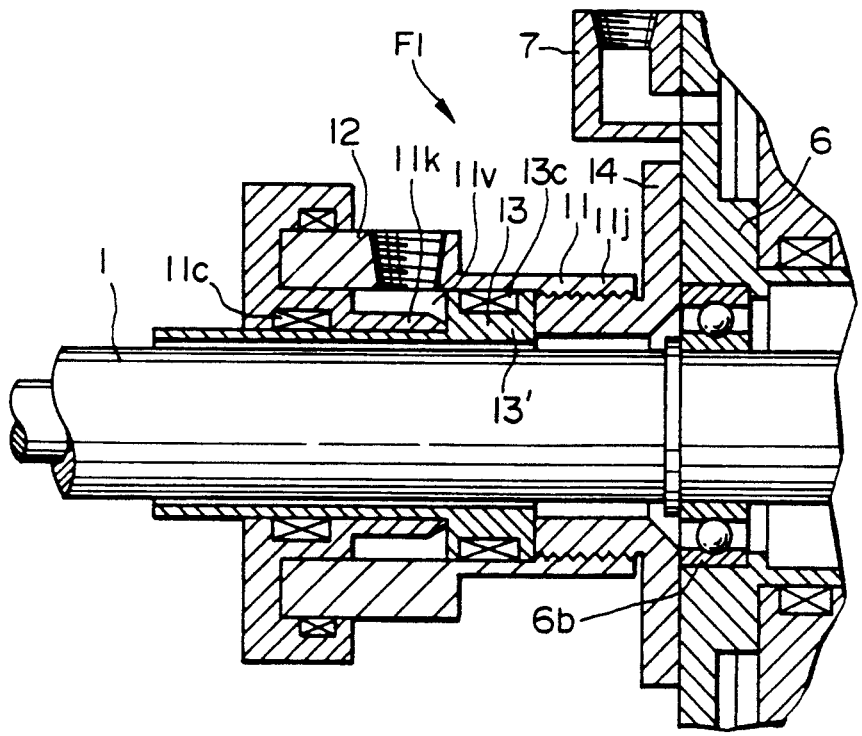
FIG. 5 is a cross sectional side view of a pressuring mechanism.

As shown in FIGS. 1 and 5, the pressing mechanism F1 is provided on the outer periphery of the hollow shaft independently of the rotation thereof, and comprises: a double walled pressure cylinder 11, a piston 13, and a connecting ring 14. The pressure cylinder 11 comprises: an outer cylinder 11j, an inner cylinder 11k which is shorter than the outer cylinder and is adapted to close an end of the outer cylinder 11j, thereby forming a pressure chamber 11v therebetween.

A roughly cylindrical piston 13, inserted in the pressure cylinder 11, is formed so that an end thereof is a thick-walled large diameter section 13' which is inserted into the outer cylinder 11j to serve as a piston. The inner diameter of the cylindrical piston 13 of the pressing mechanism F1 is made slightly larger than the outer diameter of the hollow shaft 1, and is provided so that the cylindrical piston 13 can move independent of the movement of the hollow shaft 1.

The pressure chamber 11v is pressurized by fluid pressure means (not shown) to cause the translational movement of the piston 13 in the axial direction. The pressure means is provided with a control means to keep the pressure constant inside the pressure cylinder 11v at a certain pressure value.

The connecting ring 14, shown in FIG. 5, serves to transmit the translational movement of the piston 13 to the chuck cylinder 6 supporting the hollow, shaft 1, and is a cylindrical body having an end in the form of a flange to which an end of the chuck cylinder 6 is attached, and an opposite end attached to an end of the piston 13. The reference numeral 12 refers to the guard block for piping to introduce a pressurizing medium into the pressure chamber 11v, and 11c, 13c refers to sealing means such as O-rings.

Next, the mechanism for welding the end plug C to the fuel rod P will be explained, involving the process of closing of the end 1' of the fuel rod P having a spring and a pre-fitted end plug to force the pellets therein.

The end 1' of the pre-fitted plugged fuel rod P is inserted in the hollow shaft 1 from the end 2" thereof towards the collet 2 which is screwed onto the end 1" of the hollow shaft 1. Disposed ahead is the abutting section 19 facing the collet 2 in the axial direction of the fuel rod P, and ultimately the plug C hits the abutting section 19. When the end of the end plug C butts up against the end of the abutting section 19, the fuel rod P extends beyond the collet 2 in such a way that the distance between the end surface of the abutting section 19 and the contact region between the end plug C and the fuel rod P is always constant.

In the meantime, the hollow shaft 1, the collet closure 4 and the chuck cylinder 6 which rotates the nose ring 3 are disposed freely movable in the axial direction by means of the guide 21 disposed on the base B. Also disposed on the base B is the positioning mechanism F2 comprising: the rack 24 disposed on the cylinder operating means 23 and freely movable in the axial direction; a pair of cams 26 which rotate in the same direction by the reciprocating movement of the rack 24; and the lever 15 extending out of the outer periphery of the chuck cylinder 6 and clamped between the pair of cams 26.

Therefore, when the rack 24 is moved to and fro in the axial direction by activating the cylinder operating means 23, then the cams 26 are rotated to clamp the lever 15 at a specific position, thereby assuring to position the chuck cylinder 6 at a constant location on the fuel rod P in the axial direction, thereby enabling to extend the fuel rod P beyond the collet 2 at a given constant distance.

At this stage, the fuel rod P is gripped by the holding mechanism F3 by means of the collet 2 screwed on the end 1" of hollow shaft 1, the collet closure 4 and the nose ring 3, the chuck cylinder 6 and the donut-shaped piston 8 which press the collet closure 4 toward the end 1" of the hollow shaft 1.

The above mechanism is operated by operating the chuck cylinder 6 by pressurizing the cylinder chamber 6v by pressurizing means (not shown) thus moving the donut-shaped piston 8, inserted in the chuck cylinder 6, in the end 1' direction thereof.

At this time, with reference to FIG. 3, the piston 8 presses on the flange 4a through the bearing 8b provided on the end 4' of the collet closure 4 disposed around the collet 2, thus moving the collet closure 4 towards the end 1' of the fuel rod P. Further, because the collet closure 4 and the surrounding nose ring 3 are always connected through the elastic component 9 which biases the two in the repulsing direction, and further, because the movement of the collet 2 toward the end 1' direction is restricted by the end of the nose ring 3 surrounding the collet closure 4, the collet closure 4 moves toward the end of the collet 2 against the biasing force of the spring.

The above-noted collet 2 is radially split in multiple sections, and its external peripheral surface is tapered so as to increase the diameter toward the end 1' thereof, and the internal surface of the approaching collet closure 4 also is formed with a corresponding taper, therefore, as the taper section of the collet closure 4 presses against the taper section of the collet 2, the multiply-split sections are squeezed together around the fuel rod P enabling the collet 2 to grip the fuel rod P.

While griping the fuel rod P by the collet 2 as above, the cylinder operating means 23 of the positioning mechanism F2 is operated to activate the rack 24 so as to release the cams 26 clamping the lever 15, thus releasing fixing mechanism of the positioning mechanism F2, and thereby releasing the restriction of the holding mechanism F3 holding the fuel rod P in the axial direction.

Next, by means of the pressing mechanism F1, the hollow shaft 1 is pressed against the abutting section 19, through the combined actions, including the freely movable hollow shaft 1 in the axial direction, the pressure cylinder 11, the piston 13, and the connecting ring 14.

The above presented action of the hollow shaft 1 is brought about by the following construction of the pressing mechanism F1. The pressure cylinder 11 comprises an outside cylinder 11j and an inside cylinder 11k thereby forming a cylinder chamber 11v therebetween. A piston 13 is comprised by a cylindrical section and a large diameter section, and the large diameter section is inserted in the internal surface of the outside cylinder 11j while the cylindrical section is inserted into the internal surface of the inside cylinder 11k. By pressurizing a fluid contained in the cylinder chamber 11v, the piston 13 is made to move toward the end 1'.

The pressurizing means for the cylinder chamber 11v is provided with pressure controlling means so that in the early stage of the operation, the pressure in the cylinder chamber 11v is set to be about the same as the compressive force of the spring which is inserted in the fuel rod P.

At the end of the pressurized piston 13 is attached a connecting ring 14 having a flange at an end thereof, and the flange of the connecting ring 14 is attached to an end of the chuck ring 6, as shown in FIG. 5, therefore, the movement of the piston 13 is transmitted to the chuck cylinder 6 which is supporting the hollow shaft 1.

By means of the pressing mechanism F1 as described above, the fuel rod P, having an end plug C inserted at the end 1' thereof and being held by the holding mechanism F3 provided on the hollow shaft 1, is pressed against the end plug C which is abutting the immobile abutting section 19.

In summary, the fuel rod P which has been inserted into the hollow shaft 1 is positioned at a specified position by the apparatus as follows; the hollow shaft 1 together with the holding mechanism F3 are positioned at a specific position on the fuel rod P by means of the positioning mechanism F2; and then the fuel rod P is subjected to compression under a certain load. Therefore, the fuel rods P having the end plug C fitted under constant pressure by the apparatus of the present invention always achieve a constant contact condition at the contact region.

Next, the rotating mechanism will be described. The rotating parts of the hollow shaft 1, the collet 2, the collet closure 4 and the nose ring 3 of the holding mechanism F3 are supported by the chuck cylinder 6 and the collet adjusting ring 5 screwed thereto via the bearings 6b, 8b, and 5b. A separately provided (not shown) driving means is used to drive the rotating section at a certain speed.

Welding of the end plug C to the fuel rod P is performed by welding the contact region with a welding torch 16 which is disposed adjacent to the rotating collet 2, and diametrically opposite to the periphery of the end 1' of the fuel rod P. As described above, the contact region between the fuel rod P and the end plug C is kept under a constant compression pressure by means of the pressing mechanism F1, and the pressing mechanism F1 is maintained at a constant pressure by means of pressure control means (not shown). Therefore, the pressure inside the cylinder chamber 11v varies in response to the changing compression conditions, introduced by thermal distortions of the fuel rod P during the welding operation so as to keep the contact condition constant at the contact region. Therefore, the entire contact region between the fuel rod P and the end plug C being welded is always maintained under constant contact pressure and maintaining uniform welding conditions throughout the welded portion and thereby avoiding stress changes in the weld.

Further, because of the presence of the welding chamber 18, which surrounds the welding portion between the fuel rod P and the end plug C extending beyond the collet 2, it is possible to maintain suitable gaseous shielding conditions.

In summary of the processing performed by the apparatus, uniform and constant conditions of welding are achieved by the combined actions of the series of interconnected components as follows:

(a) the fuel rod P is inserted in the hollow shaft 1 to a predetermined position in the apparatus;

(b) the holding mechanism F3 provided on the hollow shaft 1 is positioned in a predetermined position of the fuel rod P by means of the positioning mechanism F2 and fixing the position of fuel rod P at the predetermined position;

(c) pressing the end plug C into the fuel rod P under a constant pressure and maintaining the pressure;

and thereby enabling to attain, for each and every fuel rod P to be welded, a uniform and reproducibly constant condition of contact between the fuel rod P and the end plug C. Furthermore, even during the welding step, the pressing mechanism F1 adjusts the pressing pressure on the fuel rod P in response to the changing pressure conditions, introduced by thermal distortions of the fuel rod P, so as to maintain the pressure on the contact region between the fuel rod P and the end plug C to be constant and uniform, thereby avoiding the changing stresses at the contact portion. Thus, it is possible to obtain uniform welding on the entire periphery of the weld.

Figure 7:
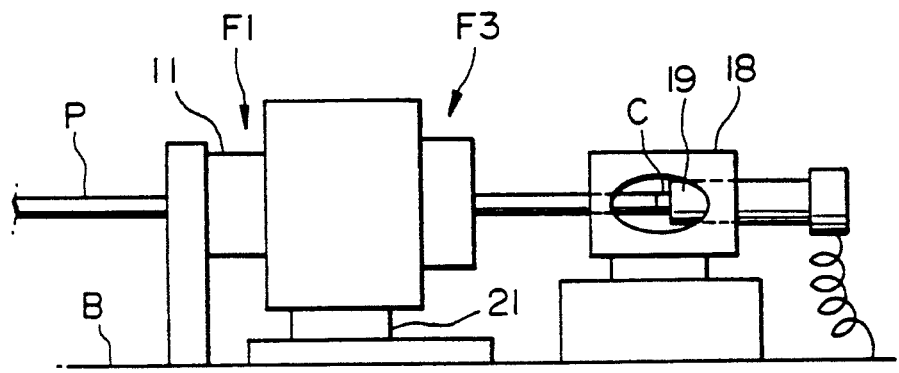
FIG. 7 is a schematic drawing to show the construction of the first embodiment.
Figure 8:
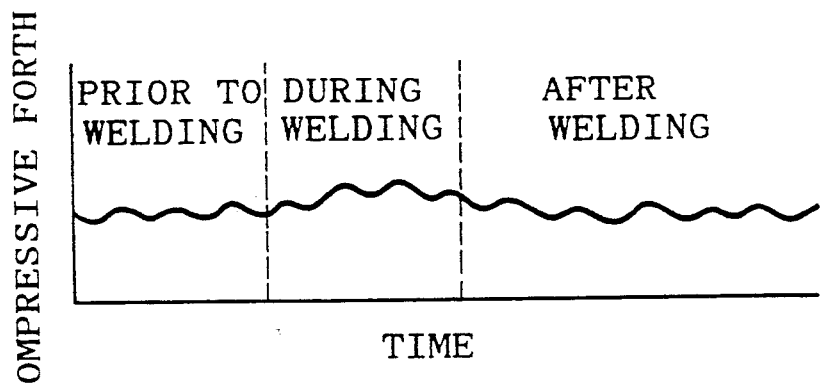
FIG. 8 shows the variations in the manner of press fitting in the first embodiment.
Figure 9:
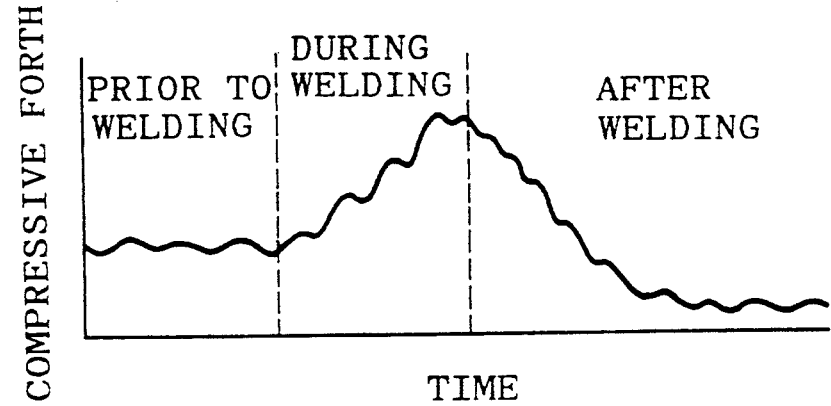
FIG. 9 shows the variations in the manner of press fitting in the conventional welding apparatus.
Figure 10:
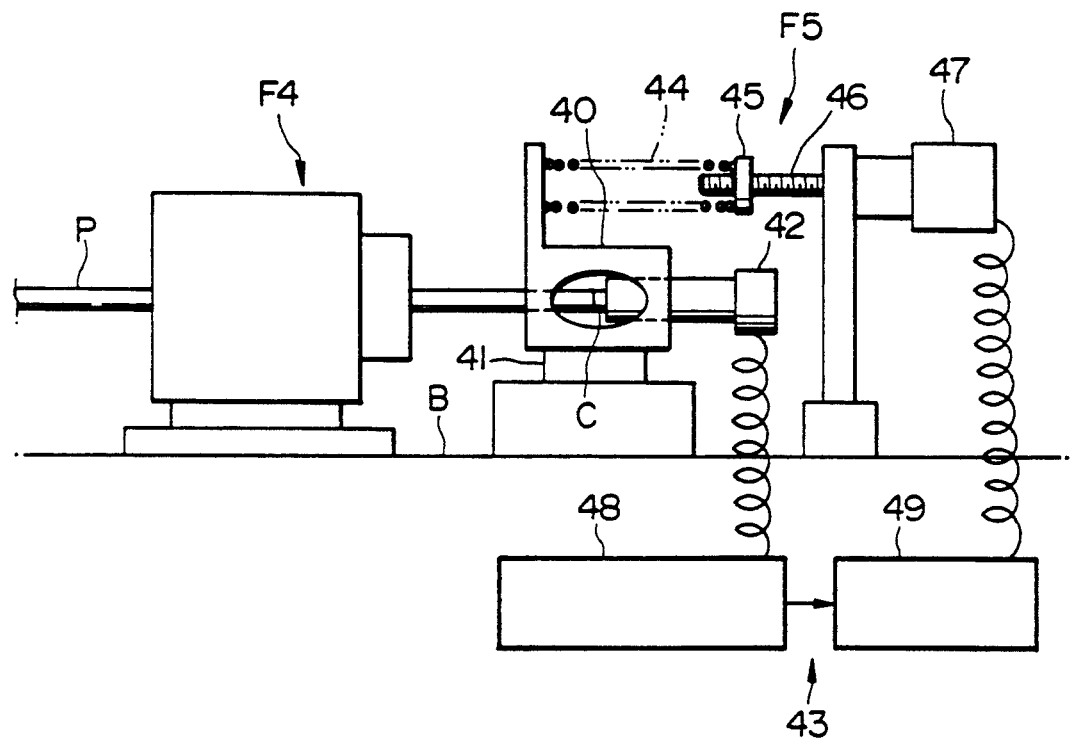
FIG. 10 is a schematic drawing to show the construction of a second embodiment.

FIG. 7 is a schematic representation of the first embodiment of the invention. In this embodiment, the welding operation is carried out by holding the fuel rod P with the holding mechanism F3 and pushing the fuel rod P toward the welding chamber 18 containing the abutting section 19 by means of a fluid pressing cylinder 11 of the pressing mechanism F1. The compressive force is monitored before, during and after welding, and the results in FIG. 8 show that the compressive force is maintained constant throughout. In contrast, when the welding operation is carried out using a holding mechanism F3 and the welding chamber (containing the abutting section) of the conventional design, the results are as shown in FIG. 9, indicating that the during the welding step, the compressive force increases due to thermal distortion of the fuel rod P, leading to changing condition of contact between the fuel rod P and the end plug C, and it is not possible to maintain the contact force constant during the welding.

In the above embodiment, the pressing means F1 utilizes a fluid means, and due to its structural limitations, it is difficult to achieve delicate control of the pressing force. Therefore, in order to achieve a finer control of the compression force, a second embodiment shown in FIG. 10 was developed. In the second embodiment, the holding mechanism F4 is used which is a fixed holding mechanism of the conventional design, i.e. those shown in FIGS. 1 to 7 of the first embodiment, in which the guide 21 is removed and the chuck cylinder 6 is fixed on the base B, and the holding mechanism F4 is modified so that the pressing device F1 and the positioning mechanism F2 are not utilized, leaving only the mechanism for holding the fuel rod P. On the other hand, the welding chamber 40 containing the abutting section 19 is disposed freely movably in the axial direction on a base B by means of the guide 41, and furthermore, the welding chamber 40 is provided with: a positioning mechanism of the same design as the foregoing positioning mechanism F2 (not shown); the pressing mechanism F5 which pushes the chamber 40 toward the holding mechanism F4; measuring means 42 (transducers and load cell etc.), and controlling means 43 for controlling the pressing mechanism F5.

The pressing mechanism F5 comprises: springs 44 (elastic component) which pushes the welding chamber 40 toward the holding mechanism F4; a nut unit 45 which engages with and moves the spring 44 in the axial direction; and a ball-screw unit 46 which is engaged with the nut unit 44; and a pulse motor 47 which rotates the ball screw unit 46 by engaging therewith. The rotating motion of the pulse motor 47 is converted into a linear motion by the nut unit 45 and the ball-screw unit 46.

The measuring means 42 is for measuring the compression force on the abutting section 19. The value of the compression force obtained by the measuring means 42 was inputted into a controller 48, and compared with the stored reference data for predetermined compression force data, and the applied compression force is regulated by feed-back control to match the predetermined reference data.

The second embodiment of the above described construction is operated as follows. The chamber 40 (including the abutting section 19) was fixed in a specific position by suitable means (not shown), and the fuel rod P with the prefitted end plug C is inserted through the inside of the holding mechanism F4 and the end plug C is butted up against the abutting section 19, and the fuel rod P is gripped by the holding mechanism F4. Next, the fixation by the suitable means is released so that the chamber 40 (including abutting section 19) is free to move, then the chamber 40 (including abutting section 19) is pushed toward the holding mechanism F4 by the force of the spring 44, and the welding of the fuel rod P to end plug C is performed.

Figure 11:
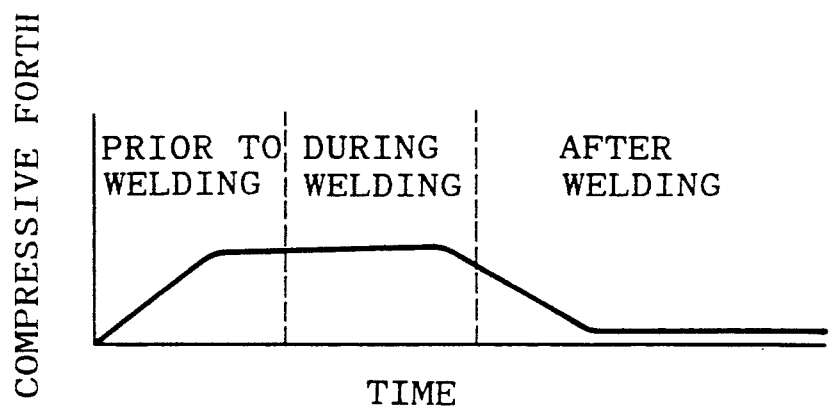
FIG. 11 shows the variations in the manner of press fitting in the second embodiment.

In this case, the controller 48 regulates the pulse motor 47 via the driver 49 so as to maintain the value of the compression force measured by the measuring means 42 to be the same as the reference value stored in the controller 48. By this procedure, the applied force is regulated to the reference value, and the welding operation is carried out at a constant predetermined compression force. An example is shown in FIG. 11 which shows a fine control achieved such that a constant force is applied up to a time during the welding period, after which the force is gradually decreased. By such a procedure, it is possible to produce a weld of high quality having no residual stress, and free from defects such as substrate undercutting and weld oversize.

In the second embodiment, the chamber 40 (including abutting section) was adjusted by regulating a pulse motor 47 by means of a controlling means 43 to control the compression in the contact region between the fuel rod P and the end plug C. However, it is permissible to replace the pressing mechanism F1 of the first embodiment shown in FIGS. 1 to 7 with the pressing mechanism F5 to control the positioning of the holding mechanism F3.

What is claimed is:

1. An apparatus for welding an end plug to a fuel rod having an end closed with said end plug and having nuclear fuel pellets filling thereinbetween, said apparatus comprising:

holding means for holding an external peripheral surface of said fuel rod inserted in an axial direction thereinto;

an abutting member disposed opposite to said holding means for abutting said end plug of said fuel rod inserted through said holding means, said holding means being moveable in said axial direction for adjusting a spacing between said holding means and said abutting member;

welding means disposed adjacent to said peripheral surface of said fuel rod between said holding means and said abutting member;

pressing means disposed on one of said holding means or said abutting member for pressing said holding means and said abutting member towards each other at a substantially constant compression force;

measuring means of measuring said compression force between said fuel rod held in said holding means and said abutting member; and pressure controlling means for regulating said pressing means in accordance with said measuring means.

2. A welding apparatus as claimed in claim 1, wherein said apparatus further comprises a positioning means, disposed on one of said holding means or said abutting member for positioning and fixing one of said holding means and abutting member at a predetermined position prior to welding, and for releasing the fixing of one of said holding means and said abutting member at said predetermined position during a welding process.

3. A welding apparatus as claimed in claim 2, wherein said pressing means is provided on an outer periphery of said hollow shaft independently of the rotation thereof.

4. A welding apparatus as claimed in claim 2, wherein said positioning means includes a cylinder mechanism disposed on a base, an axially translating rack disposed on a rod of the cylinder mechanism and extending parallel to the fuel rod being held by said holding means, a pair of cams which are rotated in the same direction by the translational movement of said rack, and a lever which protrudes out from an outer periphery of said holding means and is held between said pair of cams.

5. A welding apparatus as claimed in claim 1, wherein said welding means include an inert gas arc welding torch.

6. A welding apparatus as claimed in claim 1, wherein said end plug serves to contain said pellets inside the fuel rod by means of a spring disposed therein.

7. A welding apparatus as claimed in claim 1, wherein aid holding means includes a hollow shaft, a collet screwed on to an end of said hollow shaft, a collet closure disposed around an external periphery of said collet, a nose ring, a chuck cylinder disposed freely movable which presses said collet closure toward the hollow shaft, and a piston for pressing said collect closure.

8. A welding apparatus as claimed in claim 1, further comprising pressing means including an elastic component which pushes against one of said holding means or said abutting member, and a drive means for operating said elastic component through a force transmission means.

9. A welding apparatus as claimed in claim 8, wherein said pressing means includes a spring which pushes a welding chamber toward the holding means, a nut unit which engages with and moves the spring in the axial direction, a ball-screw unit which is engaged with the nut unit, and a motor which rotates the ball screw unit by engaging therewith.

10. A welding apparatus as claimed in claim 9, further comprising a controller regulating said motor via a driver so as to maintain a value of the compression force measured by the measuring means to be the same as the reference value stored in said controller.

11. An apparatus for welding an end plug to a fuel rod having an end closed with said end plug and having nuclear fuel pellets filling thereinbetween, said apparatus comprising:

holding means for holding an external peripheral surface of said fuel rod inserted in an axial direction thereinto;

an abutting member disposed opposite to said holding means for abutting said end plug of said fuel rod inserted through said holding means, said holding means being moveable in said axial direction for adjusting a spacing between said holding means and said abutting member;

welding means disposed adjacent to said peripheral surface of said fuel rod between said holding means and said abutting member;

pressing means disposed on one of said holding means or said abutting member for pressing said holding means and said abutting member towards each other at a substantially constant compression force;

positioning means, disposed on one of said holding means or said abutting member for positioning and fixing one of said holding means and abutting member at a predetermined position prior to welding, and for releasing the fixing of one of said holding means and said abutting member at said predetermined position during a welding process, said positioning means includes a cylinder mechanism disposed on a base, an axially translating rack disposed on a rod of the cylinder mechanism and extending parallel to the fuel rod being held by said holding means, a pair of cams which are rotated in the same direction by the translational movement of said rack, and a leer which protrudes out from the outer periphery of the holding means and is held between said pair of cams.

12. A welding apparatus as claimed in claim 11, wherein said welding means include an inert gas arc welding torch.

13. A welding apparatus as claimed in claim 11, wherein said end plug serves to contain said pellets inside the fuel rod by means of a spring disposed therein.

14. A welding apparatus as claimed in claim 11, wherein said holding means includes a hollow shaft, a collet screwed on to an end of said hollow shaft, a collet closure disposed around an external periphery of said collet, a nose ring, a chuck cylinder disposed freely movable which presses said collet closure toward the hollow shaft, and a piston for pressing said collect closure.

15. A welding apparatus as claimed in claim 11, wherein said pressing means is provided on the outer periphery of said hollow shaft independently of the rotation thereof.

* * * * *